(No Model.)
M. SCHMICKL.
TRAVELING BAG.
No. 306,530. Patented Oct. 14, 1884.
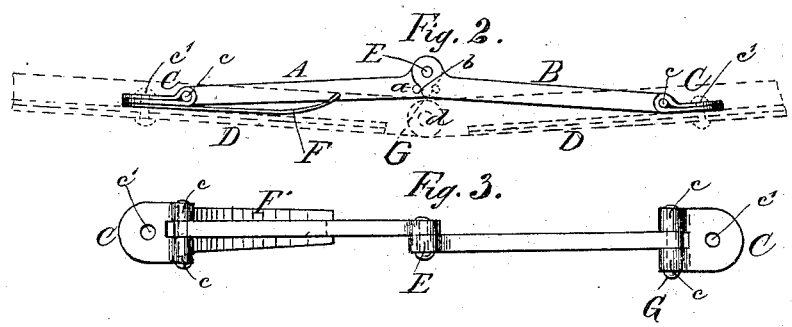
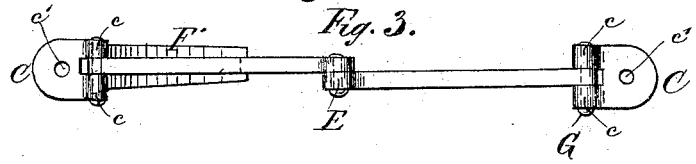
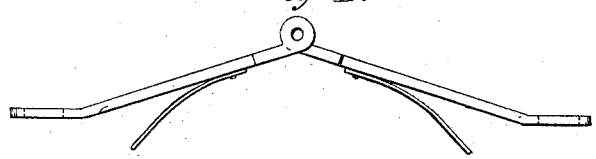
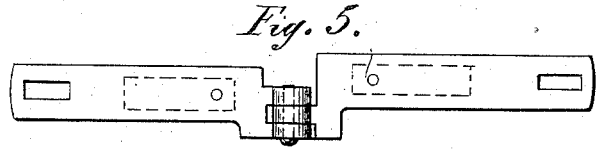
Witnesses:
Inventor:
Matthäus Schmickl
by: A. W. Almqvist
Attorney.

UNITED STATES PATENT OFFICE.

MATTHÄUS SCHMICKL, OF NEW YORK, N. Y.

TRAVELING-BAG.

SPECIFICATION forming part of Letters Patent No. 306,530, dated October 14, 1884.

Application filed August 11, 1884. (No model.)

*To all whom it may concern:*

Be it known that I, MATTHÄUS SCHMICKL, a citizen of the United States, and a resident of New York, in the county and State of New York, have invented certain new and useful Improvements in Traveling-Bags, of which the following is a specification.

My invention relates to a device patented to me August 4, 1874, by Letters Patent No. 153,851, and consisting of two arms or bars hinged together and attached with their ends to the frame of a traveling-bag, valise, or satchel at one or both of the hinged ends thereof, in such a manner that when the bag is opened the said arms may be brought in position to act together as a brace for retaining the bag open when desired.

My present invention consists in certain improvements upon that described in my aforesaid patent, as will be hereinafter fully described, and then specifically pointed out in the claim, reference being had to the accompanying drawings, in which—

Figures 1 and 2 represent side views of my said improved device in the positions respectively as when folded and unfolded, a portion of the traveling-bag frame to which it is attached being shown in dotted lines. Fig. 3 is a plan view of the same without the said frame. Figs. 4 and 5 are a side and plan view, respectively, of the device described in my previous patent in position as when unfolded, and are shown merely for comparison to facilitate the distinction between the old and the new.

A and B are two arms or bars, hinged together at E by a knuckle-joint, one or both of the bars being provided with a pin or shoulder, $a$, acting as a stop against a shoulder, $b$, of the other bar when in the position shown in Fig. 2. The free or separated ends of the bars A and B are hinged to and between lugs $c\ c$, which are formed upon a plate, C, which latter has a hole through it, and by a rivet, $c'$, through the said hole and through a corresponding hole in the frame D of the traveling-bag is riveted to the latter, in such a position, however, that the hinge E will coincide with the hinge $d$ of the frame D, or at least will be at such a small distance centrally above it as to allow of retaining the frame D, when open, in a nearly horizontal position convenient for access. I prefer forming the hinge-lugs $c$ in one piece with the plate C, and making the latter of a doubled piece of thin metal, as shown in Figs. 1 and 2, and then filing or milling out the opening to receive the end of the bar to be hinged to the said plate. When the traveling-bag or valise is opened and the knuckle-joint E raised in the position shown in Fig. 2— that is, raised above the plane passing through the center lines of the hinge-joint G until the shoulders $a\ b$ meet—it will retain the said position and keep the bag open until the knuckle-joint E be purposely depressed for again folding the brace and closing the bag. The raising of the joint E in opening the bag can of course be done by hand; but, as it is preferable to make it automatic, I form out of a thin metallic plate a spring, F, making a hole through one of its ends to coincide with the hole of the rivet $c'$, and bending up its free end, I arrange it between the lug C and the frame D, fastening it to the latter by the same rivet, $c'$, which secures the lug, and filing a little notch in its bent-up end to receive the bar A or B and prevent lateral displacement. I arrange it underneath the bar resting on the frame, so that the elasticity of the spring will always tend to raise the bar, and thereby the knuckle-joint and the other bar. Two springs F may be used, one under each bar; but one is sufficient. In my previous construction (shown in Figs. 4 and 5) the springs were riveted to the bars themselves near the hinge-joint, and the ends of the bars were slotted and attached to the frame by bolts passing through the said slots in such a manner as to slide upon the said bolts in contact with the frame, the ends of the bars themselves acting as stops against the frame to prevent the hinge rising too far. The said construction necessitated the use of bars of a considerably greater width than the present, in order to allow of the attachment of the springs and of slotting the bars, thus rendering it clumsy in appearance as well as more expensive. Besides, the loose sliding joint will often bend and kink, and the bolts or rivets through them get loose, owing to such kinks and sliding motion; but by the present simple improvement these objections are removed. The brace is neat in appearance, cheap in construction, the fastenings firm, and the joints steady and easy in their movements.

Having thus described my invention, what I claim as new, and desire to secure by Letters Patent, is—

The combination of the bars A B, hinged together by a knuckle-joint, and hinged with their separated ends to lugged plates C, immovably secured to the frame D of a traveling-bag, with a spring, F, secured with the lug-plate C to the frame D, and with its free end tending to raise one of the said bars A B, the stops of the said knuckle-joint acting when the center of the said joint is a little above the center plane of the two lug-hinges G, as hereinbefore set forth.

In testimony that I claim the foregoing as my invention I have signed my name, in presence of two witnesses, this 2d day of July, 1884.

MATTHÄUS SCHMICKL.

Witnesses:
A. W. ALMQVIST,
ALF. FORNANDER.